US012651748B2

(12) United States Patent
Xue et al.

(10) Patent No.: US 12,651,748 B2
(45) Date of Patent: Jun. 9, 2026

(54) CLASS OF CATHODE MATERIALS AND SECONDARY ION BATTERIES CONTAINING THESE CATHODE MATERIALS

(71) Applicant: TECHNICAL INSTITUTE OF PHYSICS AND CHEMISTRY, CHINESE ACADEMY OF SCIENCES, Beijing (CN)

(72) Inventors: Mianqi Xue, Beijing (CN); Hui Ma, Beijing (CN); Xusheng Wang, Beijing (CN)

(73) Assignee: TECHNICAL INSTITUTE OF PHYSICS AND CHEMISTRY, CHINESE ACADEMY OF SCIENCES, Beijing (CN)

( * ) Notice: Subject to any disclaimer, the term of this patent is extended or adjusted under 35 U.S.C. 154(b) by 757 days.

(21) Appl. No.: 18/046,421

(22) Filed: Oct. 13, 2022

(65) Prior Publication Data

US 2023/0246189 A1 Aug. 3, 2023

(30) Foreign Application Priority Data

Jan. 29, 2022 (CN) .......................... 202210113054.3
Jan. 29, 2022 (CN) .......................... 202210113108.6

(51) Int. Cl.
*H01M 4/583* (2010.01)
*H01M 4/02* (2006.01)
(Continued)

(52) U.S. Cl.
CPC .......... *H01M 4/583* (2013.01); *H01M 4/485* (2013.01); *H01M 4/505* (2013.01); *H01M 4/525* (2013.01);
(Continued)

(58) Field of Classification Search
CPC ...... H01M 4/583; H01M 4/485; H01M 4/505; H01M 4/525; H01M 4/582; H01M 4/5825;
(Continued)

(56) References Cited

U.S. PATENT DOCUMENTS

2021/0151756 A1 5/2021 Iqra et al.

FOREIGN PATENT DOCUMENTS

CN 103782439 A 5/2014
CN 104221190 A 12/2014
(Continued)

OTHER PUBLICATIONS

Reduced Graphene Oxide/Lil Composite Lithium Ion Battery Cathodes Sanghyeon Kim, Sung-Kon Kim, Pengcheng Sun, Nuri Oh, and Paul V. Braun Nano Letters (Year: 2017).*
(Continued)

*Primary Examiner* — Nicholas A Smith
*Assistant Examiner* — Seamus Patrick McNulty
(74) *Attorney, Agent, or Firm* — NKL Law; Allen Xue

(57) ABSTRACT

A class of cathode materials and secondary ion batteries containing these materials are provided. These cathode materials at least include a cathode active substance comprising a first active substance and a carrier. The first active substance is selected from alkali metal halide or alkali metal sulfite, alkaline earth metal halide or alkaline earth metal sulfite, aluminum halide, zinc halide and zinc sulfite. The carrier has a low-dimensional structure and is selected from a template and/or a second active substance. The first active substance of the cathode material has a relatively low molecular weight and a relatively high redox potential, and thus the secondary ion batteries have a relatively high specific capacity and voltage.

19 Claims, 8 Drawing Sheets

(51) Int. Cl.

| | |
|---|---|
| *H01M 4/485* | (2010.01) |
| *H01M 4/505* | (2010.01) |
| *H01M 4/525* | (2010.01) |
| *H01M 4/58* | (2010.01) |
| *H01M 10/052* | (2010.01) |
| *H01M 10/0568* | (2010.01) |
| *H01M 10/0569* | (2010.01) |

(52) U.S. Cl.
CPC ......... *H01M 4/582* (2013.01); *H01M 4/5825* (2013.01); *H01M 10/052* (2013.01); *H01M 10/0568* (2013.01); *H01M 10/0569* (2013.01); *H01M 2004/021* (2013.01); *H01M 2004/027* (2013.01); *H01M 2004/028* (2013.01); *H01M 2300/0028* (2013.01)

(58) Field of Classification Search
CPC .......... H01M 10/052; H01M 10/0568; H01M 10/0569; H01M 2004/021; H01M 2004/027; H01M 2004/028; H01M 2300/0028; H01M 4/1397; H01M 4/366; H01M 4/364; H01M 4/38; H01M 10/0525; H01M 10/054; H01M 10/36; H01M 2300/0002; H01M 2300/0025; H01M 2300/0065; H01M 2300/0085; Y02E 60/10
See application file for complete search history.

(56) References Cited

FOREIGN PATENT DOCUMENTS

| | | | |
|---|---|---|---|
| CN | 107819126 | A | 3/2018 |
| CN | 107910193 | A | 4/2018 |
| CN | 109509872 | A | 3/2019 |
| CN | 112673498 | A | 4/2021 |
| CN | 110165170 | B | 8/2021 |
| CN | 113871607 | A | 12/2021 |
| JP | 2015518644 | A | 7/2015 |
| JP | 2017531907 | A | 10/2017 |
| JP | 2018520488 | A | 7/2018 |
| JP | 2020530183 | A | 10/2020 |
| KR | 20030051141 | A | 6/2003 |
| KR | 20170029703 | A | 3/2017 |
| KR | 20170067878 | A | 6/2017 |
| KR | 20180028511 | A | 3/2018 |

OTHER PUBLICATIONS

Wen-Chen Chien, Ya-Ru Li, She-Huang Wu, Yi-Shiuan Wu, Zong-Han Wu, Ying-Jeng James Li, Chun-Chen Yang, Modifying the morphology and structure of graphene oxide provides high-performance LiFePO4/C/rGO composite cathode materials, Advanced Powder Technology, (Year: 2020).*

Lung-Hao Hu, B., Wu, FY., Lin, CT. et al. Graphene-modified LiFePO4 cathode for lithium ion battery beyond theoretical capacity. Nat Commun 4, 1687 (Year: 2013).*

Hu, Hao et al., "A robust 2D organic polysulfane nanosheet with grafted polycyclic sulfur for highly reversible and durable lithium-organosulfur batteries", Nano Energy, vol. 57, Mar. 2019, pp. 1-31.

* cited by examiner

CLASS OF CATHODE MATERIALS AND SECONDARY ION BATTERIES CONTAINING THESE CATHODE MATERIALS

TECHNICAL FIELD

The present disclosure relates to the technical field of batteries, specifically a class of cathode materials and secondary ion batteries containing these materials.

BACKGROUND

The development of the existing lithium batteries meet the requirements from the electronic products, to power tools and automobiles, and power grid level energy storage. Lithium-ion batteries systems based on lithium iron phosphate, ternary and other cathode materials can satisfy the majority of current application scenarios. However, the abundance and cost of lithium metal will greatly limit the further development of lithium-ion batteries. Thus, there is an urgent need for developing a class of electrode materials with high performance and low cost to meet the increasing energy demand.

In order to realize a high capacity and a high voltage, the electrode material should have a low molecular weight and a high redox potential. Metal halides and sulfites have the two advantages as well as cost-efficient superiority, and are expected to become ideal cathode materials. Taking lithium chloride and potassium sulfite as examples, the theoretical energy densities are 2780 Wh/kg and 1320 Wh/kg, respectively, which are much higher than commercialized cathode materials such as lithium cobaltate and lithium manganate. However, their cubic structure and high deionization energy barrier make them difficult to achieve reversible charge and discharge. The present disclosure reduces the deionization energy barrier by changing the dimensions or the crystal form of the material, thereby enabling reversible charge and discharge.

SUMMARY

To solve the problems described above, the present disclosure provides a class of cathode materials and secondary batteries containing these materials. The present disclosure prepares a class of cathode materials based on metal halides and sulfites with high specific energy and high voltage by reducing the dimension or changing the crystal form of these materials. The present disclosure further constructs secondary ion batteries system based on these cathode material, which have high energy density and good cycling stability.

The purposes of the present disclosure are realized by the following technical solutions:

The present disclosure provides a class of cathode materials, at least including a cathode active substance comprising a first active substance and a carrier, wherein:

the first active substance is selected from alkali metal halide or sulfite, alkaline earth metal halide or sulfite, aluminum halide, zinc halide and zinc sulfite;

the carrier has a low-dimensional structure; the carrier is selected from a template and/or a second active substance.

According to the present disclosure, in the cathode material, the first active substance may be uniformly distributed on the carrier or in the low-dimensional structure of the carrier.

According to the present disclosure, the low-dimensional structure comprises at least one of zero-dimensional, one-dimensional, two-dimensional, three-dimensional and multi-level structures.

According to the present disclosure, the low-dimensional structure may comprise a crystalline structure or an amorphous structure.

In the present disclosure, the low-dimensional structure refers to that the minimum structural unit has a size of not more than 1 μm in at least one dimension, for example, 1-100 nm.

According to the present disclosure, the template and the second active substance have a zero-dimensional, one-dimensional, two-dimensional, three-dimensional or multi-level structure. The multi-level structure in the present disclosure refers to a structure comprising at least two of zero-dimensional, one-dimensional, two-dimensional and three-dimensional structures.

Illustratively, the template of a zero-dimensional structure, for example, is selected from at least one of, including but not limited to, a quantum dot, a nanoparticle and so on.

Illustratively, the template of a one-dimensional structure, for example, is selected from at least one of, including but not limited to, a nanowire, a nanotube, a nanobelt, a nanopore and so on.

Illustratively, the template of a two-dimensional structure, for example, is selected from at least one of, including but not limited to, graphene, MXene, boron nitride, transition metal chalcogenide, metal-organic framework compound, covalent organic framework compound, layered double hydroxide, transition metal oxide, metal nanosheets, black phosphorus and so on.

Illustratively, the template of a multi-level structure, for example, is a template having a low-dimensional structure itself or prepared from a material having a low-dimensional structure, and is selected from, but not limited to, at least one of activated carbon, metal-organic framework material, covalent organic framework material, alumina template, metal foam, micro-nano structure prepared by micro-machining and so on.

Illustratively, the template of a three-dimensional structure is a substance of any three-dimensional structure or is prepared from at least one of a zero-dimensional, one-dimensional or two-dimensional structure template, e.g., formed by stacking, assembling, applying or self-assembly in a solution.

In the present disclosure, the carrier reduces the dimension of the first active substance or disturbs or changes the crystal form, thereby lowering the deionization energy barrier.

According to the present disclosure, at least a part of the halide or sulfite in the cathode material is in the low-dimensional structure.

According to the present disclosure, the carrier is preferably selected from a template and optionally comprises or does not comprise the second active substance.

According to the present disclosure, the second active substance is selected from any one of electrode materials known in the art, preferably at least one of layered oxide, prussian blue analog, polyanion compound, conductive macromolecule and organic material, for example, $LiMn_2O_4$, ternary material, $Na_nCu_xFe_yMn_zO_2$, $Na_{n^-}Ni_xFe_yMn_zO_2$, $Na/K_xPR(CN)_6$ (P and R are Fe, Co, Ni, Mn, etc.), $K_xMnO_2$, $LiFePO_4$, $Na_xFe_y(PO_4)_n$, $Na_xFe_y(SO_4)_n$, polypyrrole, polyaniline and other materials.

Preferably, the second active substances are nanoparticles, and the nanoparticles can further constitute a micron sphere. It should be noted that, the micron sphere disclosed herein refers to a spherical structure composed of a plurality of nanoparticles and having a size up to the micrometer level. Illustratively, the micron sphere has a diameter of no less than 0.1 $\mu$m, for example, 0.1-100 $\mu$m.

It should be noted that, the form of the template is not specified in the present disclosure, and may be selected from any form of dispersion, foam, assembled film, powder, slurry, gel and so on, for example, foam.

According to the present disclosure, the alkali metal halide is selected from at least one of lithium chloride, lithium bromide, lithium iodide, sodium chloride, sodium bromide, sodium iodide, potassium chloride, potassium bromide and potassium iodide.

According to the present disclosure, the alkali metal sulfite is selected from at least one of lithium sulfite, sodium sulfite and potassium sulfite.

According to the present disclosure, the alkaline earth metal halide is selected from at least one of magnesium chloride, magnesium bromide, magnesium iodide, calcium chloride, calcium bromide and calcium iodide.

According to the present disclosure, the alkaline earth metal sulfite is selected from magnesium sulfite and/or calcium sulfite.

According to the present disclosure, the aluminum halide is selected from at least one of aluminum chloride, aluminum bromide and aluminum iodide.

According to the present disclosure, the zinc halide is selected from at least one of zinc chloride, zinc bromide, zinc iodide and so on.

According to the present disclosure, the first active substance accounts for 1%-99% of the mass of the cathode material, preferably 5%-90%, e.g., 10%, 20%, 30%, 40%, 50%, 60%, 70%, 80% or 90%.

According to the present disclosure, the carrier accounts for 0.1%-99% of the mass of the cathode material, preferably 1%-95%, more preferably 5%-90%, e.g., 10%, 20%, 30%, 40%, 50%, 60%, 70%, 80% or 90%.

It should be noted that, the mass ratio of the template to the second active substance in the carrier is not specified in the present disclosure, and can be obtained by selecting a mass ratio known in the art as long as the positive described above electrode material can be obtained. Illustratively, in the carrier, the mass ratio of the template to the second active substance is (0.1-1):(0-10), e.g., (0.1-1):0.1, (0.1-1):0.2, (0.1-1):0.3, (0.1-1):0.4, (0.1-1):0.5, (0.1-1):0.6, (0.1-1):0.7, (0.1-1):0.8, (0.1-1):0.9, (0.1-1):1, (0.1-1):2, (0.1-1):3, (0.1-1):4, (0.1-1):5, (0.1-1):6, (0.1-1):7, (0.1-1):8, (0.1-1):8 or (0.1-1):10.

According to the present disclosure, the first active substance has the low-dimensional structure or a micro-nano grain structure.

According to the present disclosure, when the first active substance is distributed in the low-dimensional structure, the first active substance has the low-dimensional structure. The low-dimensional structure has the meaning as described above.

Illustratively, the first active substance in the cathode material is selected from KI, which has a two-dimensional crystal structure.

According to the present disclosure, when the first active substances are distributed on the carrier to form the micro-nano grain. The mass content of the micro-nano grain in the first active substance is not specified in the present disclosure, for example, 0-10%, for another example, 0-5%, and for still another example, 0-1%.

Preferably, the particle size of the micro-nano grain is in a range of 0.1-5 $\mu$m, preferably 0.5-5 $\mu$m, for example, 1 $\mu$m.

According to the present disclosure, the cathode material may be further treated by a method known in the art, for example, by carbonization, elution or other known methods, to substantially obtain a cathode material without template.

According to an exemplary embodiment of the present disclosure, the cathode material comprises the first active substance and the carrier; the carrier comprises the second active substance; the first active substance and the second active substance are compounded to form the cathode material. For example, the first active substance is filled in the gaps among the nanoparticles or the micron spheres of the second active substance, and the two substances are compounded to form the cathode material.

The present disclosure further provides a method for preparing the cathode material described above, comprising mixing the carrier and the first active substance, followed by compounding to obtain the cathode material described above, wherein the carrier and the first active substance are defined as above.

Preferably, when the carrier is selected from a template and optionally comprises or does not comprise the second active substance, the mixing comprises:

mixing the template and the first active substance, followed by adding with the second active substance; or, mixing the template and the second active substance, followed by adding with the first active substance; or, mixing the second active substance and the first active substance, followed by adding with the template.

According to the present disclosure, the method further comprises: optionally treating the cathode material after the compounding by any one of high-temperature carbonization, elution and so on.

According to the present disclosure, in the method, the carrier may be pretreated to obtain a desired form, and preferably, the carrier is pretreated to obtain any form of dispersion, foam, assembled film, powder, slurry and so on, for example, foam.

According to the present disclosure, the high-temperature carbonization specifically comprises: carbonizing the cathode material at a high temperature of 400-1000° C., for example, at a high temperature of 700° C. Illustratively, the time for the carbonization is 1-100 h, for example, 4 h.

According to an exemplary embodiment of the present disclosure, the method for preparing the cathode material comprises the following steps:

(1) ultrasonically dispersing the carrier to obtain a mixture, and then freeze drying to obtain a foam, (2) adding a solution containing the first active substance dropwise onto the foam obtained in step (1), and drying in the air to obtain a cathode material precursor, and (3) carbonizing the cathode material precursor obtained in step (2) to under high temperature treatment to obtain the cathode material described above.

According to the present disclosure, the carrier and the first active substance are defined as above.

According to the present disclosure, the concentration of the carrier in the mixture is 1-100 mg/g, for example, 10 mg/g.

Preferably, the step (2) optionally further comprise slicing the foam. The slicing in the present disclosure refers to that the foam is cut into any shape to meet the requirement of the process of the battery. Illustratively, the shape may be circular and square.

Preferably, the solution containing the first active substance comprises the first active substance and a solvent.

Preferably, the solvent is selected from a volatile solvent, e.g., methanol, ethanol, acetone, dichloromethane and so on. Illustratively, the solution containing the first active substance is selected from a solution of potassium iodide in methanol.

Preferably, the concentration of the first active substance in the solution containing the first active substance is 0.01-10 g/mL, for example, 0.1 g/mL.

According to the present disclosure, the elution specifically comprises: adding the cathode material into an eluting agent to remove all or a part of the template.

Preferably, the eluting agent is selected from organic solvent, such as concentrated acid or concentrated base. Illustratively, the concentrated acid is selected from concentrated hydrochloric acid.

According to an exemplary embodiment of the present disclosure, the method for preparing the cathode material comprises the following steps:

(1) ultrasonically dispersing the first active substance and the carrier in the solvent to obtain a mixture, and drying to obtain a solid material;

(2) adding the solid material obtained in step (1) into the elution agent to remove all or a part of the template to obtain an intermediate; and (3) drying the intermediate obtained in step (2) to obtain the cathode material.

Preferably, the drying may be conducted by a method known in the art, for example, drying in vacuum at 90° C. for 6 h.

The present disclosure further provides a modified cathode material obtained by elution the template in the cathode material, wherein the template and the elution are defined as above.

According to the present disclosure, the modified cathode material substantially comprises no template.

The present disclosure further provides use of the cathode materials in a secondary ion battery. Preferably, the secondary ion battery is selected from at least one of organic secondary ion battery, aqueous secondary ion battery, organic/aqueous hybrid secondary ion battery, gel battery, quasi-solid battery, all-solid-state battery and so on.

According to the present disclosure, the secondary ion battery further comprises an anode material; the anode material is selected from a metal and a carbon-based anode material.

According to the present disclosure, the metal is selected from at least one of lithium, sodium, potassium, magnesium, aluminum and zinc.

According to the present disclosure, the carbon-based anode material may be a commercially available material or a self-made material. Illustratively, the carbon-based anode material is selected from at least one of activated carbon, graphite, hard carbon, soft carbon and so on.

According to the present disclosure, the secondary ion battery further comprises an electrolyte solution, a gel electrolyte or a solid-state electrolyte.

According to the present disclosure, the electrolyte solution is selected from an aqueous electrolyte solution, an organic electrolyte solution and an aqueous/organic hybrid electrolyte solution.

According to the present disclosure, the electrolyte solution comprises an electrolyte and a solvent.

According to the present disclosure, in the electrolyte solution, the electrolyte is selected from at least one of lithium salt, sodium salt, potassium salt, calcium salt, magnesium salt, aluminum salt and zinc salt.

Illustratively, the lithium salt is selected from at least one of lithium sulfate, lithium nitrate, lithium acetate, lithium perchlorate, lithium chloride, lithium bis(fluorosulfonyl)imide (LiFSI), lithium trifluoromethanesulfonate, lithium bis((trifluoromethyl)sulfonyl)imide (LiTFSI) and lithium bis(pentafluoroethanesulfonyl)imide.

Illustratively, the sodium salt is selected from at least one of sodium perchlorate, sodium acetate, sodium nitrate, sodium chloride, sodium sulfate, sodium bis(fluorosulfonyl) imide (NaFSI), sodium trifluoromethanesulfonate, sodium bis((trifluoromethyl)sulfonyl)imide and sodium bis(pentafluoroethanesulfonyl)imide.

Illustratively, the potassium salt is selected from at least one of potassium nitrate, potassium acetate, potassium sulfate, potassium chloride, potassium bis(fluorosulfonyl)imide (KFSI), potassium trifluoromethanesulfonate, potassium bis((trifluoromethyl)sulfonyl)imide and potassium bis(pentafluoroethanesulfonyl)imide.

Illustratively, the magnesium salt is selected from at least one of magnesium trifluoromethanesulfonate, magnesium sulfate, magnesium chloride, magnesium acetate and magnesium bis((trifluoromethyl)sulfonyl)imide.

Illustratively, the zinc salt is selected from at least one of zinc trifluoromethanesulfonate, zinc sulfate, zinc chloride, zinc acetate and zinc bis((trifluoromethyl)sulfonyl)imide.

According to the present disclosure, in the electrolyte solution, the concentration of the electrolyte is 0.01-100 mol/L, for example, 0.01-20 mol/L, 1-10 mol/L, 1-100 mol/L, 5-70 mol/L, 10 mol/L, 30 mol/L, 50 mol/L, 70 mol/L and 100 mol/L.

According to the present disclosure, the solvent is selected from, but not limited to, at least one of water or organic solvent such as ester, ether or nitrile. Illustratively, the ester is selected from, but not limited to, at least one of propylene carbonate, diethyl carbonate and ethylene carbonate. Illustratively, the ether is selected from ethylene glycol dimethyl ether (DME). Illustratively, the nitrile is selected from acetonitrile.

Illustratively, the aqueous electrolyte solution is $K(FSI)_{0.55}(OTf)_{0.45}\cdot0.9H_2O$ aqueous solution.

Illustratively, the organic electrolyte solution is selected from a solution of KFSI in propylene carbonate.

According to the present disclosure, the gel electrolyte comprises a first polymer body material and an electrolyte solution, wherein the electrolyte solution is selected from the organic electrolyte solution.

Preferably, the first polymer body material is selected from at least one of polyvinyl alcohol (PVA), polyacrylic acid, polyacrylamide, sodium polyacrylate, polyethylene oxide, polypropylene carbonate, polyether ether ketone, ethylene glycol acrylonitrile block copolymer, poly(vinylidene fluoride-co-hexafluoropropylene) and so on.

According to the present disclosure, the gel electrolyte further comprises a deep eutectic gel polymer electrolyte. Preferably, the deep eutectic gel polymer electrolyte comprises a deep eutectic solvent and a deep eutectic electrolyte. Further, the deep eutectic solvent comprises a solid hydrogen bond acceptor (a quaternary ammonium salt and so on) and a solid hydrogen bond donor (urea, amide and so on), and the deep eutectic electrolyte comprises at least one of the electrolyte and the polymer described above.

According to the present disclosure, the solid-state electrolyte is selected from at least one of a polymer electrolyte, an inorganic solid-state electrolyte and a composite solid-state electrolyte.

According to the present disclosure, the polymer electrolyte comprises a second polymer body and an electrolyte.

Preferably, the second polymer body comprises at least one of the first polymer body, polyethylene oxide, polypropylene oxide and so on.

According to the present disclosure, the inorganic solid-state electrolyte is selected from at least one of a sulfide solid-state electrolyte and an oxide solid-state electrolyte.

Preferably, the sulfide solid-state electrolyte comprises a sulfur-lithium superionic conductor, a sulfur-sodium superionic conductor and argyrodite such as $Li_3PS_4$, $Na_3PS_4$, $Li_6PS_5Cl$ and so on.

Preferably, the oxide solid-state electrolyte is selected from at least one of perovskite, a sodium fast ionic conductor, a lithium fast ionic conductor and garnet such as $La_{0.8}Sr_{0.2}Ga_{0.8}Mg_{0.2}O_3$, $NaLaS_2$, $La_{0.5}Li_{0.5}TiO_3$, $Li_7La_3Zr_2O_{12}$ and so on.

Preferably, the composite electrolyte comprises the polymer electrolyte and a second phase inorganic filler, wherein the polymer electrolyte is defined as above; the second inorganic filler is selected from at least one of a metal oxide nanoparticle such as $TiO_2$, $SiO_2$, $Al_2O_3$, $ZrO_2$, $MgO$, $ZnO_x$ and so on, zeolite, montmorillonite and so on.

According to the present disclosure, the ion battery has good cycle performance and relatively high energy density.

Illustratively, at a current density of 500 $mA·g^{-1}$, the capacity retention rate of the aqueous secondary ion battery after 100 recharge/discharge cycles is 95% or greater, for example, 95%-99.9%.

Illustratively, at a current density of 100 $mA·g^{-1}$, the capacity retention rate of the organic secondary ion battery after 600 recharge/discharge cycles is 88% or greater.

In the present disclosure, the method for preparing the secondary ion battery can be obtained through assembling by a method known in the art.

Illustratively, the method for preparing the secondary ion battery comprises assembling an aqueous battery comprising the above cathode materials, activated carbon as anode, and a 62 mol/kg aqueous $K(FSI)_{0.55}(OTf)_{0.45}·0.9H_2O$ solution as electrolyte solution.

Beneficial Effects

The present disclosure provides a class of cathode materials prepared from a first active substance, which has high universality. Meanwhile, the preparation methods are simple, convenient, and low-cost.

In the secondary ion battery prepared from the cathode material disclosed herein, the first active substance in the cathode material comprises a low-dimensional structure and/or a micro-nano grain, wherein the low-dimensional structure mainly provides capacity. The low-dimensional structure and/or the micro-nano grain in the first active substance can be partially dissolved in the electrolyte solution or precipitated from the electrolyte solution to form the low-dimensional structure and/or the micro-nano grain. Along with the charging and discharging processes of the battery, the micro-nano grain can be dissolved into electrolyte solution as a supplement and then deposited on the surface of the carrier to form the first active substance with the low-dimensional structure, thus ensuring the stable operation of the battery. Since the first active substance of the cathode material has a relatively low molecular weight and a relatively high redox potential, the secondary ion battery of the present disclosure has relatively high specific capacity and voltage, thus providing a relatively high energy density. The aqueous secondary battery of the present disclosure improves the energy density and the cycling stability of the aqueous cathode material by employing the high-concentration electrolyte solution and combining the cathode material disclosed herein, and can meet the industrialization requirement of the aqueous secondary battery.

DETAILED DESCRIPTION

The present disclosure will be illustrated in further detail by the following description of specific embodiments. It should be understood that the following embodiments are merely exemplary illustration and explanation of the present disclosure, and should not be construed as limiting the protection scope of the present disclosure. All techniques implemented based on the content of the present disclosure described above are encompassed within the protection scope of the present disclosure.

Unless otherwise stated, the experimental methods used in the following examples are conventional methods. Unless otherwise stated, the reagents, materials and so on used in the following examples are commercially available.

In the following examples, the electrochemical performance of the batteries was tested at 25° C. unless otherwise stated.

Example 1-A. Potassium Ion Battery

1. Preparation of Cathode Material:

(1) An aqueous dispersion containing graphene oxide (GO, 3 mg/g) and activated carbon (AC, 7 mg/g) was ultrasonicated for 2 h to obtain a mixture; 5 mL of the mixture was added into a culture dish with a diameter of 3.5 cm and froze for 2 h in a low-temperature refrigerator at −80° C. The mixture was frozen drying for 40 h at −60° C. to obtain a GO/AC foam.

(2) The GO/AC foam was punched into discs with a diameter of 11 mm; a 25 mg/mL KBr in methanol (200 μL) on each disc, and the round sheets were placed in a fume hood for 48 h to obtain a KBr/GO/AC sample after methanol was completely volatilized.

(3) The KBr/GO/AC sample prepared in step (2) was carbonized at a high temperature for 4 h in a 700° C. tube furnace to obtain KBr/reduced graphene oxide (rGO)/AC-composite.

Figure 1:
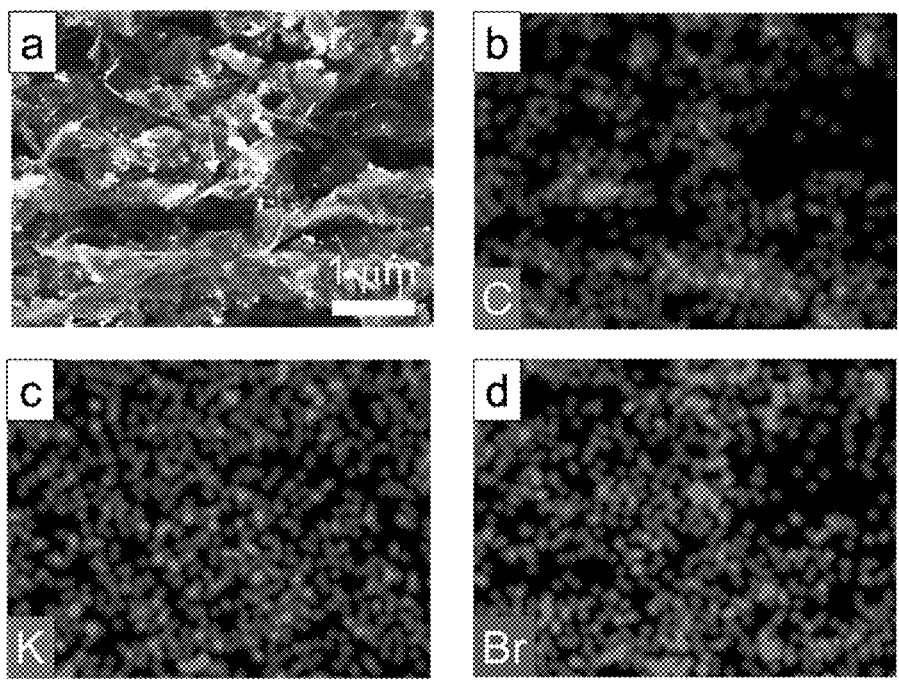
FIG. 1 illustrates the microstructure of the KBr/rGO/AC composite according to Example 1-A; panel a: a scanning electron micrograph (SEM) image; panels b-d: energy spectrum analysis.

FIG. 1 illustrates the microstructure of the KBr/rGO/AC cathode. From the SEM image and energy spectrum analysis, it can be seen that KBr is evenly distributed in the foam. The average particle size of the micron grain is 1 μm.

Figure 2:
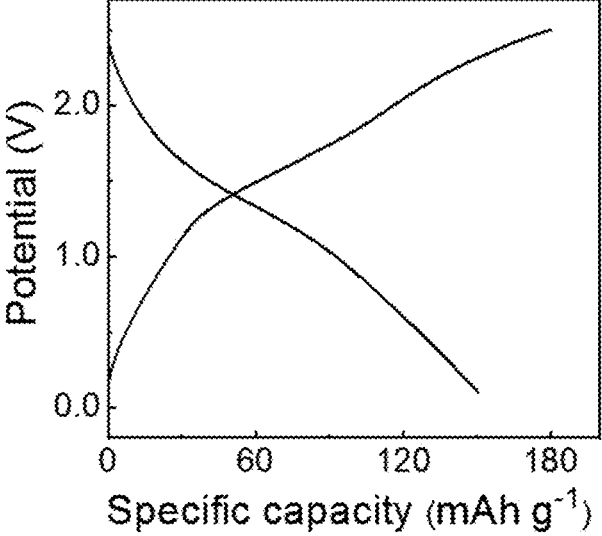
FIG. 2 is a charge/discharge curve of the aqueous battery according to Example 1-A.
Figure 3:
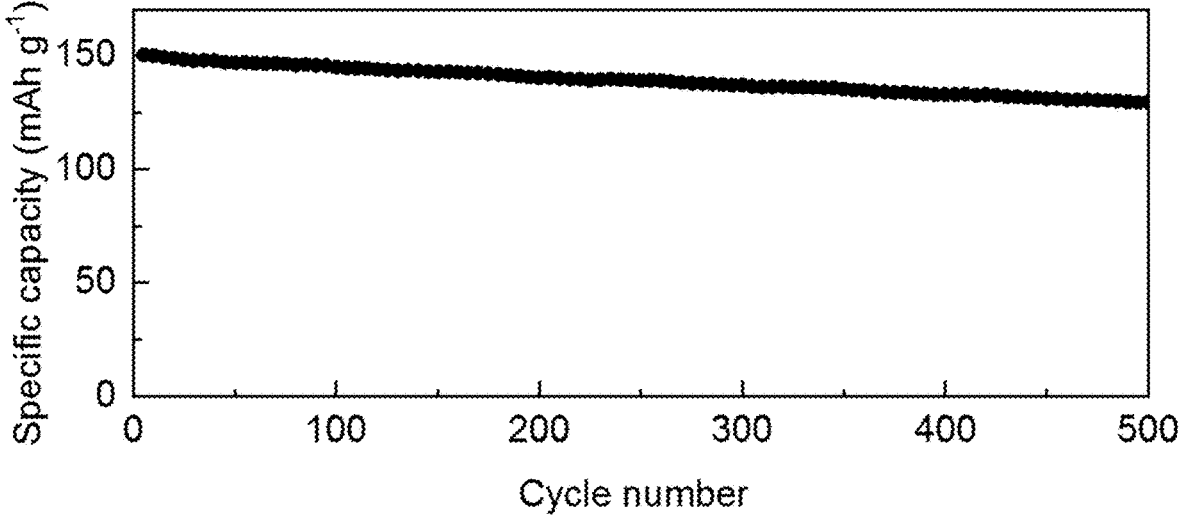
FIG. 3 illustrates the cycle performance after 500 charge/discharge cycles of the aqueous battery according to Example 1-A.

2. Preparation of aqueous battery: The full battery was assembled with the KBr/rGO/AC composite as the cathode, AC as the anode, 62 mol/kg aqueous $K(FSI)_{0.55}$ $(OTf)_{0.45}·0.9H_2O$ solution as the electrolyte solution and a glass fiber (GFF) as the separator. The mass of KBr in the cathode is 2 mg, and the mass of the anode AC is 12 mg. FIG. 2 illustrates the charge/discharge curve of the battery at a current density of 500 mA/g. The specific discharge capacity of the battery is 150 mAh/g and the capacity retention rate after 500 cycles is 86% (FIG. 3).

Example 1-B

1. Preparation of Cathode Material:

Steps (1)-(3) are the same as those in Example 1-A, wherein KBr in step (2) was replaced with KI to finally prepare the KI/rGO/AC composite.

Figure 4:
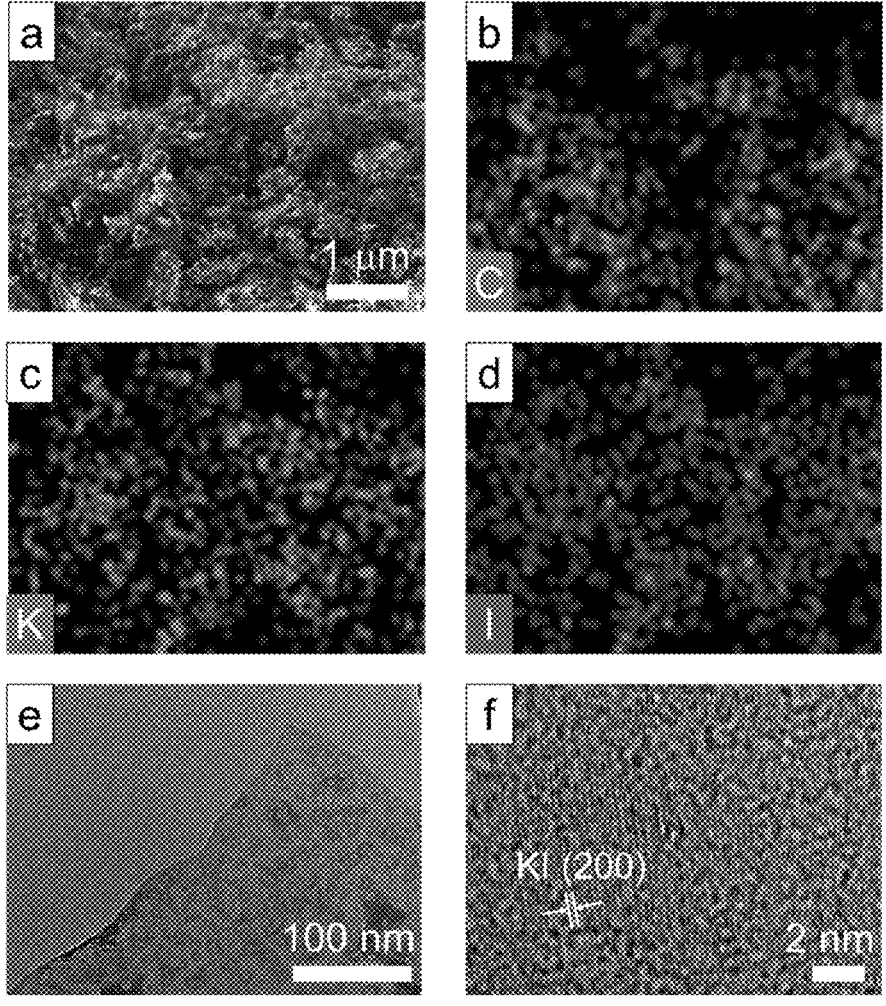
FIG. 4 illustrates the microstructure of the KI/rGO/AC composite according to Example 1-B; panel a: SEM images; panels b-d: energy spectrum analysis; panels e and f: transmission electron microscope (TEM) images.

FIG. 4 illustrates the microstructure of the KI/rGO/AC composite, in which KI was evenly distributed in the foam. In TEM image, the two-dimensional KI crystal has a lattice spacing of 0.35 nm, which corresponded to 200 crystal plane. According to the element analysis, the mass fraction of KI in the composite is 50%.

Figure 5:
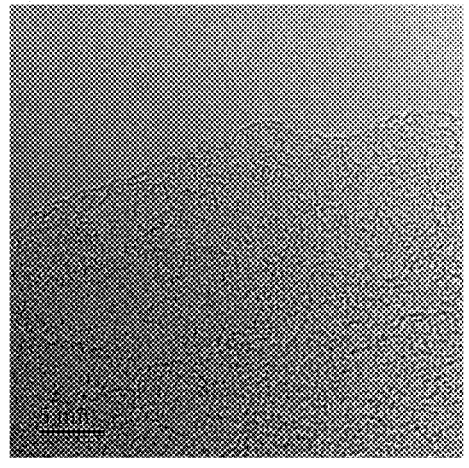
FIG. 5 is a TEM images of the KI/rGO/AC composite after 100 cycles according to Example 1-B.

2. Preparation of half-cell: A half-cell was assembled with the KI/rGO/AC material described above as the cathode, metallic potassium as the anode, 8 mol/L solution of KFSI in propylene carbonate as the electrolyte solution and GFF as the separator, wherein the mass of the cathode active substance KI is 3.7 mg. The half-cell still has a 94% capacity retention rate after 100 charge/discharge cycles at a current density of 100 mA/g. FIG. 5 illustrates a TEM image of the KI/rGO/AC cathode after 100 charge/discharge cycles and lattice distortion and lattice fringes of KI crystal can be observed.

Figure 6:
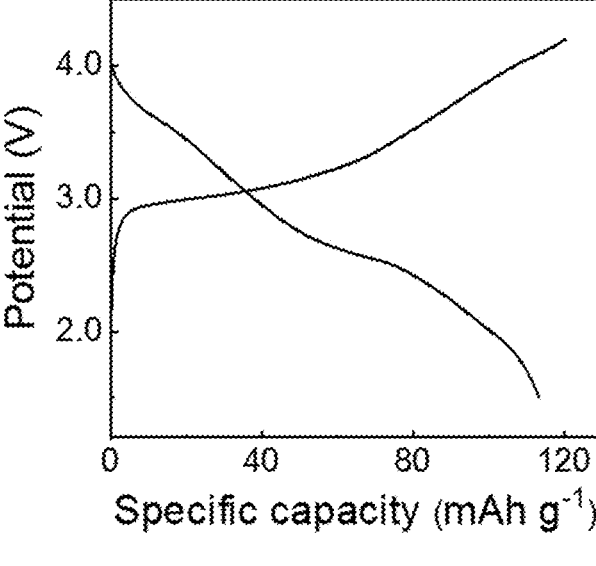
FIG. 6 is a charge/discharge curve of the full battery according to Example 1-B.

3. Preparation of full battery: A full battery was assembled with the KI/rGO/AC material described above as the cathode, pre-potassiated graphite as the anode, 8 mol/L KFSI in propylene carbonate as the electrolyte solution and GFF as the separator, wherein the mass of the cathode active substance KI is 3.7 mg, and the mass of the anode active substance is 3 mg. FIG. 6 is a charge/discharge curve of the full battery at a current density of 500 mA/g. The specific discharge capacity of the full battery is 113 mAh/g, and the full battery still has a 73% capacity retention rate after 800 charge/discharge cycles.

Example 2. Lithium-Ion Battery

1. Preparation of cathode material: The preparation method in this example is the same as that of Example 1-A, except that solutions of LiCl, LiBr or LiI in methanol were added dropwise on the round sheets in step (2), and LiCl/rGO/AC composite, LiBr/rGO/AC composite and LiI/rGO/AC composite were prepared, respectively. The mass fractions of the active substances LiCl, LiBr and LiI in the composites are 45%, 51% and 48%, respectively.

Figure 7:
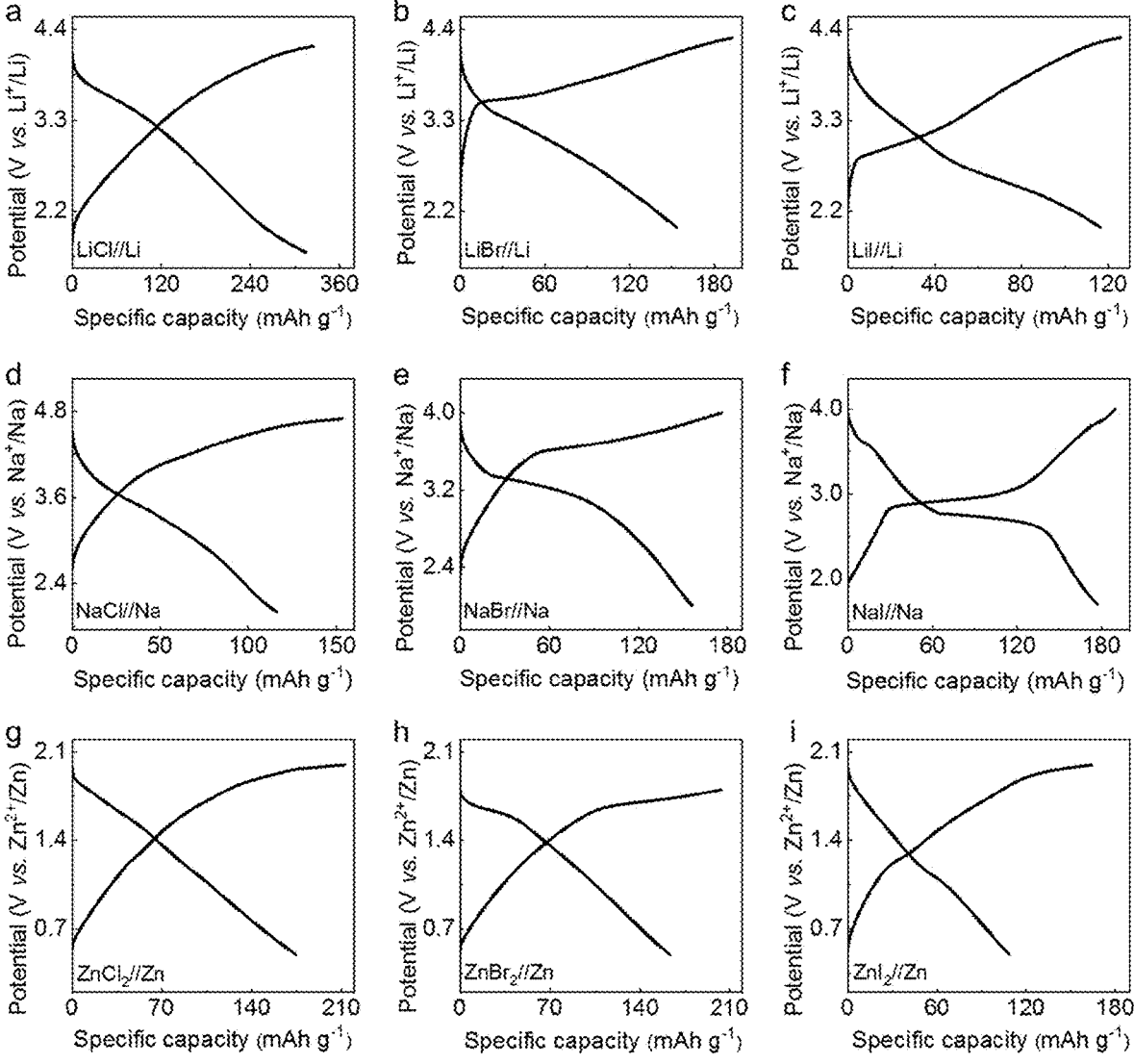
FIG. 7 is a charge/discharge curve of the battery according to Examples 2-4.

2. Assembly of battery: Half-cells were assembled with the LiCl/rGO/AC composite, the LiBr/rGO/AC composite or the LiI/rGO/AC composite in this example as the cathode, metallic lithium as the anode, 10 mol/L LiFSI in propylene carbonate as the electrolyte solution and GFF as the separator. In FIG. 7, panels a-c are charge/discharge curves of the three batteries described above at a current density of 100 mA/g, and the specific discharge capacities are 315 mAh/g, 153 mAh/g and 117 mAh/g, respectively.

Example 3. Sodium-Ion Battery

1. Preparation of cathode material: The preparation method in this example is the same as that of Example 1-A, except that solutions of NaCl, NaBr or NaI in methanol or a mixture of water and methanol were added dropwise on the round sheets in step (2), and NaCl/rGO/AC composite, NaBr/rGO/AC composite and NaI/rGO/AC composite were prepared, respectively. The mass fractions of the active substances NaCl, NaBr and NaI in the composites are 52%, 46% and 48%, respectively.

2. Assembly of battery: Half-cells were assembled with the NaCl/rGO/AC composite, the NaBr/rGO/AC composite or the NaI/rGO/AC composite in this example as the cathode, metallic sodium as the anode, 6 mol/L NaFSI in propylene carbonate as the electrolyte solution and GFF as the separator. In FIG. 7, panels d-f are charge/discharge curves of the three batteries at a current density of 100 mA/g, and the specific discharge capacities are 116 mAh/g, 156 mAh/g and 177 mAh/g, respectively.

Example 4. Zinc-Ion Battery

1. Preparation of cathode material: The preparation method in this example is the same as that of Example 1-A, except that solutions of $ZnCl_2$, $ZnBr_2$ or $ZnI_2$ in methanol were added dropwise on the round sheets in step (2), and $ZnCl_2$/rGO/AC composite, $ZnBr_2$/rGO/AC composite and $ZnI_2$/rGO/AC composite were prepared, respectively. The mass fractions of the active substances $ZnCl_2$, $ZnBr_2$ and $ZnI_2$ in the composites are 47%, 46% and 46%, respectively.

2. Assembly of battery: Half-cells were assembled with the three materials in this example as the cathode, metallic zinc as the anode, 2 mol/L $Zn(TFSI)_2$ in acetonitrile as the electrolyte solution and GFF as the separator. In FIG. 7, panels g-i are charge/discharge curves of the three batteries described above at a current density of 100 mA/g, and the specific discharge capacities are 174 mAh/g, 163 mAh/g and 108 mAh/g, respectively.

Example 5. Sulfite

1. Preparation of cathode material: The preparation method of the cathode material in this example is the same as that of Example 1-A, except that: in step (2), 0.1 g/mL $K_{25}O_3$ in a mixture of water and methanol was added dropwise on the round sheet; in step (3), the $K_2SO_3$/GO/AC sample was carbonized at a high temperature of 500° C. in a tube furnace for 4 h to prepare the $K_2SO_3$/rGO/AC composite, wherein the average particle size of the $K_2SO_3$ micron grain is 3 μm. According to the element analysis, the mass fraction of $K_2SO_3$ in the $K_2SO_3$/rGO/AC composite is 45%.

2. Assembly of aqueous battery: The preparation method in this example is the same as that of Example 1-A, except that the cathode is $K_2SO_3$/rGO/AC material, wherein the mass of the active substance $K_2SO_3$ of the cathode material is 2 mg. The battery still has an 82% capacity retention rate after 1000 charge/discharge cycles at a current density of 500 mA/g.

Figure 8:
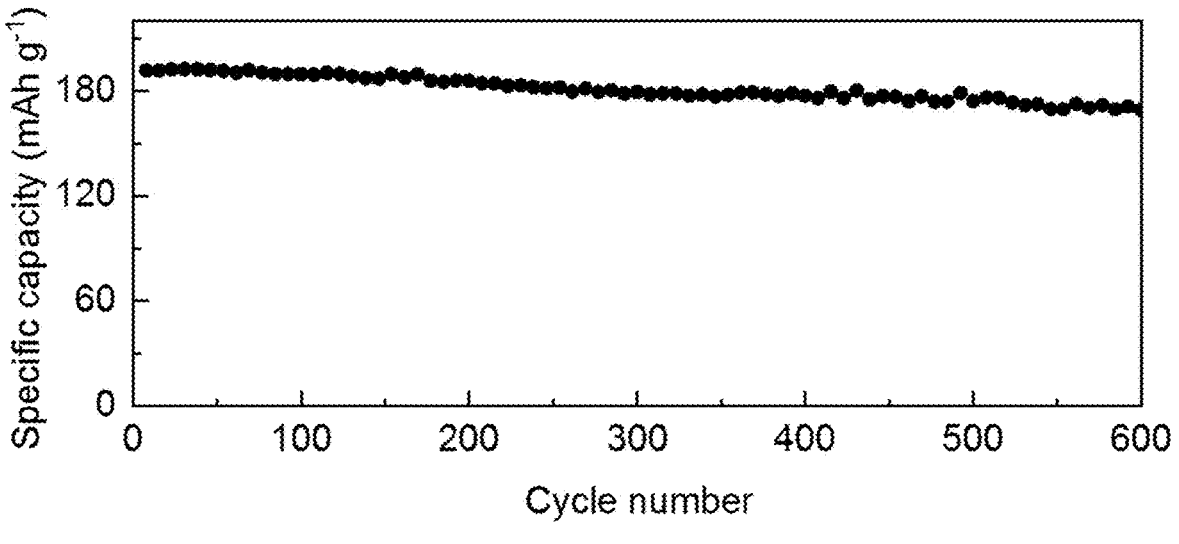
FIG. 8 illustrates the cycle performance after 600 charge/discharge cycles of the battery according to Example 5.

3. Assembly of half-cell: The cathode was $K_2SO_3$/rGO/AC material, the anode was potassium, and the electrolyte solution was 6 mol/L KFSI in DME. FIG. 8 illustrates the cycle performance after 600 charge/discharge cycles of the battery, in which the battery still has an 88% capacity retention rate after 600 charge/discharge cycles at a current density of 100 mA/g.

Example 6-A. Addition of Second Active Substance

1. Preparation of cathode material: (1) The 0.5 g of sodium iron manganese nickelate ($NaNi_{1/3}Fe_{1/3}Mn_{1/3}O_2$, the second active substance) with a microspheric micro-structure was added into a 0.1 g/mL NaBr (the first active substance) in methanol (2 mL). The mixture was magneti-cally stirred for 12 h and then placed in a fume hood until the methanol completely evaporating. After that, the mixture was heated for 6 h in an air blast drier at 90° C. and the dried solid was ground for later use. By this method, NaBr could be filled in the gaps among the micron spheres to form $NaBr/NaNi_{1/3}Fe_{1/3}Mn_{1/3}O_2$ composite.

(2) The $NaBr/NaNi_{1/3}Fe_{1/3}Mn_{1/3}O_2$ composite, conduc-tive carbon black and PVDF were mixed in a ratio of 8:1:1, and the slurry was applied on an aluminum foil current collector and dried. The material was punched into discs with a diameter of 11 mm for later use. The mass of the cathode active substance NaBr and $NaNi_{1/3}Fe_{1/3}Mn_{1/3}O_2$ are 1 mg and 2.5 mg, respectively.

2. Assembly of battery: The battery was assembled with the composite described above as the cathode, sodium as the anode, 6 mol/L NaFSI in propylene carbonate as the elec-trolyte solution and GFF as the separator. The battery still has a capacity retention rate of up to 93.5% after 800 charge/discharge cycles at a current density of 500 mA/g.

Example 6-B. Addition of Second Active Substance

1. Preparation of cathode material: The method is the same as that of Example 6-A, except that $NaNi_{1/3}Fe_{1/3}Mn_{1/3}O_2$ was replaced with lithium iron phosphate ($LiFePO_4$), and NaBr was replaced with LiBr.

Figure 9:
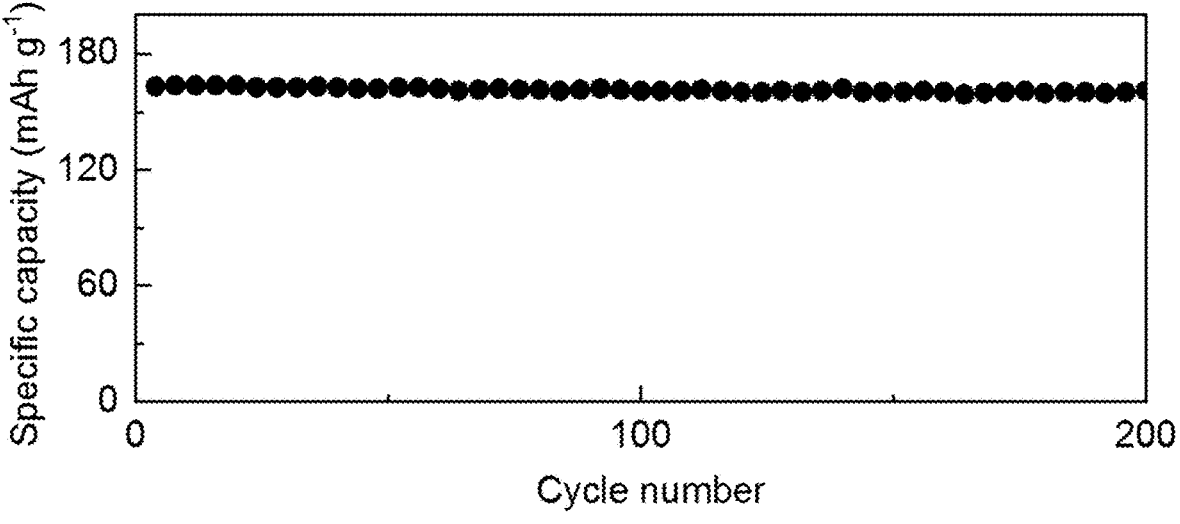
FIG. 9 illustrates the cycle performance after 200 charge/discharge cycles of the battery according to Example 6-B.

2. Assembly of half-cell: The half-cell was assembled with the $LiFePO_4$/LiBr described above as the cathode, lithium as the anode, 10 mol/L LiFSI in propylene carbonate as the electrolyte solution and GFF as the separator, wherein the mass of the cathode active substance LiBr and $LiFePO_4$ are 1.0 mg and 2.5 mg, respectively. FIG. 9 illustrates the cycle performance after 200 charge/discharge cycles of the battery at a current density of 100 mA/g, in which the battery still has a capacity retention rate of up to 98.6% after 200 charge/discharge cycles.

Example 7. Eluting Template

Figure 10:
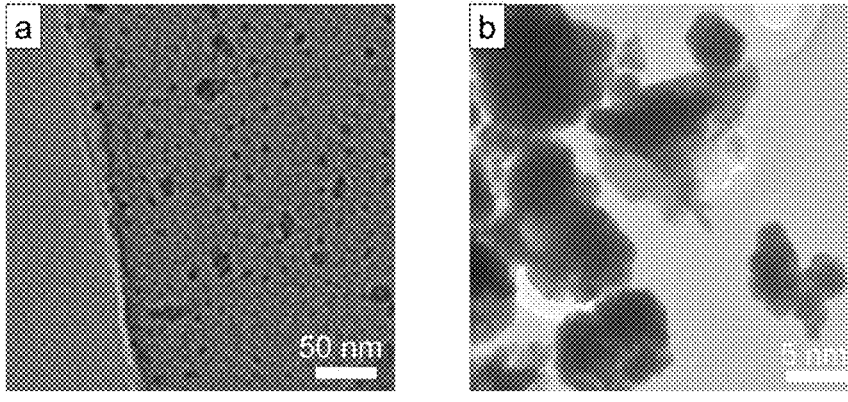
FIG. 10 displays TEM images of the NaCl-based cathode material before (a) and after (b) elution of the template according to Example 7.

1. Preparation of cathode material: (1) 0.1 g of $TiO_2$ nanosheets was added to 100 mL of a 0.01 g/mL NaCl in a mixture of methanol and water (in a mass ratio of 1:1) and magnetically stirred for 12 h. The dispersion was heated to 50° C. until the solvent was completely evaporated and NaCl was uniformly deposited on the surface of $TiO_2$ nanosheets partially in the form of nanoparticles due to electrostatic interaction (FIG. 10, panel a). The material was heated for 6 h in an air blast drier at 90° C. to obtain a solid, and the dried solid was added into concentrated hydrochloric acid. Since the $TiO_2$ nanosheets were soluble while NaCl was insoluble in concentrated hydrochloric acid, the template was etched and only leaving low-dimensional NaCl. The elution of template didn't destroy the structure of NaCl, which is still partially in the state of nanoparticles, and the particle size did not change greatly before and after elution (FIG. 10, panel b). After the template was rinsed, the resulting NaCl solid was dried in vacuum at 90° C. for 6 h and then ground for later use.

(2) The step (1) was repeated for multiple times to obtain 0.5 g of the NaCl solid described above. NaCl, conductive carbon black and PVDF were mixed in a ratio of 7:2:1, and the slurry was applied on an aluminum foil current collector and dried. The material was punched into discs with a diameter of 11 mm for later use.

2. Assembly of half-cell: The half-cell was assembled with the NaCl described above as the cathode, metallic sodium as the anode, 6 mol/L NaFSI in propylene carbonate as the electrolyte solution and GFF as the separator, wherein the mass of the cathode active substance NaCl was 1.8 mg. The half-cell still has a capacity retention rate of up to 93% after 600 charge/discharge cycles at a current density of 100 mA/g.

Example 8. Hydrogel Battery

1. The preparation of hydrogel: The 0.05 mol of $NaClO_4$ and 5 g of PVA were added to 5 mL of deionized water, and the mixture was stirred at room temperature for 20 min. Subsequently, the mixture was heated to 95° C. and con-tinuously stirred for 2 h to give a homogeneous gel solution. The gel solution was added into a petri dish with a diameter of 6 cm and solidified in a refrigerator at −20° C. for 4 h to obtain a $PVA-NaClO_4$ gel. The gel was shaped with a hole punch into discs with a diameter of 16 mm for later use.

2. Assembly of full battery: A full battery was assembled with the NaI/rGO/AC composite prepared in Example 3 as the cathode, AC as the anode and $PVA-NaClO_4$ as the gel electrolyte. The battery had a capacity retention rate of up to 95% after 100 charge/discharge cycles at a current density of 500 mA/g.

Example 9. Organic Gel Battery

1. The preparation method of organic gel: The 0.3 g of polyethylene oxide (PEO) and 4.5 mL of 1 mol/L NaFSI in propylene carbonate were mixed and magnetically stirred for 12 h. The mixture was added to a petri dish with a diameter of 6 cm and let stand at room temperature for 7 days to give a PEO-NaFSI-PC organic gel electrolyte. The gel was punched into discs with a diameter of 16 mm for later use.

Figure 11:
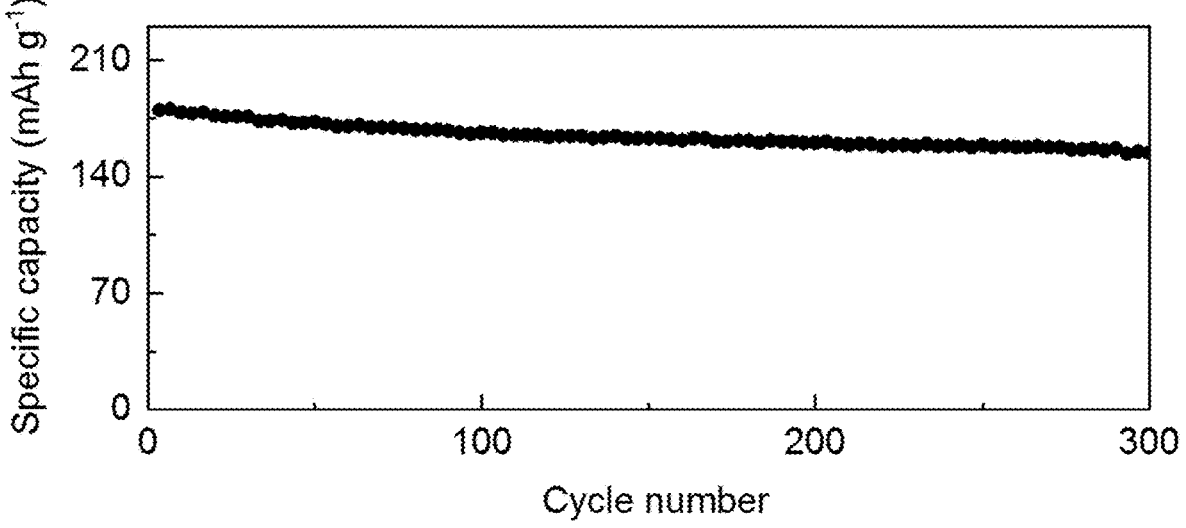
FIG. 11 illustrates the cycle performance after 300 charge/discharge cycles of the organic gel battery according to Example 9.

2. Assembly of half-cell: The battery was assembled with the NaI/rGO/AC composite prepared in Example 3 as the cathode, metallic sodium as the anode and PEO-NaFSI-PC as the gel electrolyte. FIG. 11 illustrates the cycle perfor-mance of the battery, in which the battery still has an 86% capacity retention rate after 300 charge/discharge cycles at a current density of 100 mA/g.

Example 10. Organic/Aqueous Hybrid Electrolyte Battery

The battery was assembled with $ZnI_2/rGO/AC$ in Example 4 as the cathode, metallic zinc as the anode, 2 mol/L $Zn(TFSI)_2$ in a mixed solvent of acetonitrile and water (in a volume ratio of 10:1) as the electrolyte solution and GFF as the separator. The battery has a capacity retention rate of up to 89% after 200 charge/discharge cycles at a current density of 100 mA/g.

Example 11. All-Solid-State Battery

The preparation method of solid-state electrolyte: The 0.4 g of poly(vinylidene fluoride-hexafluoropropylene) (PVDF-HFP) was dissolved in 5 mL of anhydrous N,N-dimethyl-formamide, and the mixture was stirred well for 24 h. After then, 0.1 g of lithium bis((trifluoromethyl)sulfonyl)imide (LiTFSI) was added, and the mixture was further stirred for 24 h to obtain a homogeneous mixed solution. The well mixed slurry was quickly poured into a tetrafluoroethylene mold, and slowly vacuumized and dried for 48 h. The dried solid-state electrolyte film PVDF-HFP-LiTFSI was gently removed from the mold and quickly transferred to a glove box. The film was punched into sheets with a diameter of 16 mm for later use.

Assembly of half-cell: The solid battery was assembled using the above solid-state electrolyte with $LiI/rGO/AC$ in Example 2 as the cathode and metallic lithium as the anode. The battery has a capacity retention rate of up to 89% after 800 charge/discharge cycles at a current density of 100 mA/g.

Comparative Example 1

1. Preparation of KBr composite: KBr (AR), conductive carbon black and PVDF were mixed in a mass ratio of 8:1:1. The slurry was applied on an aluminum foil current collector and dried in a drying oven at 100° C. for 6 h to obtain discs with a diameter of 11 mm for later use, wherein the mass of KBr is 3 mg.

2. Assembly of aqueous battery: An aqueous battery for testing was assembled with the KBr described above as the cathode, 62 mol/kg $K(FSI)_{0.55}(OTf)_{0.45} \cdot 0.9H_2O$ aqueous solution as the electrolyte solution and GFF as the separator. The aqueous battery only has a 42% capacity retention rate after 50 charge/discharge cycles at a current density of 500 mA/g. The specific discharge capacity is 50 mAh/g, which is only 30% of that of Example 1-A.

Comparative Example 2

Figures 12, 13:
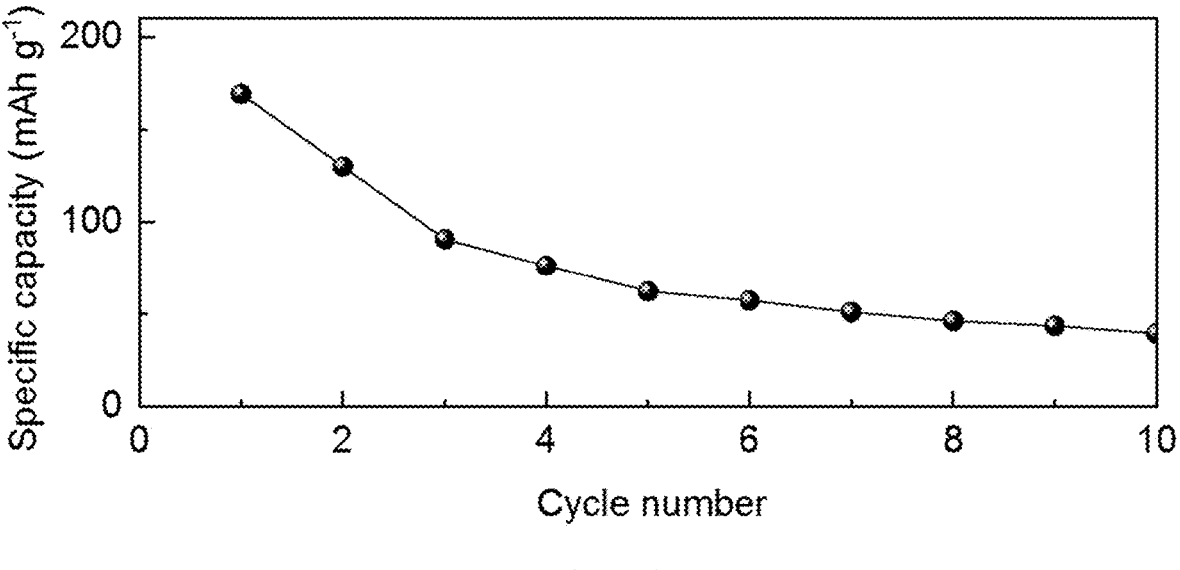
FIG. 12 illustrates the cycle performance after 10 charge/discharge cycles of the battery according to Comparative Example 2.
FIG. 13 illustrates the cycle performance after 100 charge/discharge cycles of the battery according to Comparative Example 3.

The battery was assembled with the $NaNi_{1/3}Fe_{1/3}Mn_{1/3}O_2/NaBr$ composite in Example 6-A as the cathode, metallic sodium as the anode, 2 mol/L NaFSI in propylene carbonate as the electrolyte solution and GFF as the separator. FIG. 12 illustrates the cycle performance of the aqueous battery, in which the battery only has a 23.3% capacity retention rate after 10 charge/discharge cycles at a current density of 500 mA/g.

Comparative Example 3

1. Preparation of cathode material: The preparation of the cathode material in this comparative example is different from that of Example 1-B in that the carrier was not added. $K_2SO_3$ as the first active substance was directly mixed with carbon black to obtain the $K_2SO_3$ composite through the following steps: $K_2SO_3$, conductive carbon black and PVDF were mixed in a mass ratio of 8:1:1. The slurry was applied on an aluminum foil current collector and dried in a drying oven at 100° C. for 6 h to obtain discs with a diameter of 11 mm for later use, wherein the mass of the active substance $K_2SO_3$ is 3 mg.

2. Assembly of half-cell: The battery was assembled with the material in this comparative example as the cathode, metallic potassium as the anode, and 6 mol/L KFSI in DME as the electrolyte solution. FIG. 13 illustrates the cycle performance of the battery, in which the battery only has a 39% capacity retention rate after 100 charge/discharge cycles at a current density of 0.1 A/g. The specific discharge capacity of the battery is 105 mAh/g, which is only 55% of the specific discharge capacity of the half-cell in Example 5.

The embodiments of the present disclosure have been described above. However, the present disclosure is not limited the above embodiments. Any modification, equivalent, improvement and so on made without departing from the spirit and principle of the present disclosure shall fall within the protection scope of the present disclosure.

The invention claimed is:

1. A cathode material, materials, comprising a cathode active substance that comprises a first active substance and a carrier, wherein the first active substance is selected from alkali metal halide, alkali metal sulfite, alkaline earth metal halide, alkaline earth metal sulfite, aluminum halide, zinc halide, and zinc sulfite, and the carrier has a low-dimensional structure and is at least one selected from a template and a second active substance;

wherein the low-dimensional structure is a zero-dimensional structure, a one-dimensional structure, or a two-dimensional structure, or a multi-level structure; and the multi-level structure comprises at least two selected from the zero-dimensional structure, the one-dimensional structure, and the two-dimensional structure, wherein the cathode material is prepared by a method comprising the following steps:

S1: ultrasonically dispersing the carrier in a liquid to obtain a mixture, and then freeze drying to obtain a foam, S2: adding a solution containing the first active substance dropwise onto the foam obtained in S1, and drying in the air to obtain a cathode material precursor, and S3: carbonizing the cathode material precursor obtained in S2 to a high-temperature treatment to obtain the cathode material.

2. The cathode material according to claim 1, wherein in the cathode material, the first active substance is uniformly distributed on the carrier or in the low-dimensional structure of the carrier.

3. The cathode material according to claim 1, wherein the alkali metal halide is selected from at least one of lithium chloride, lithium bromide, lithium iodide, sodium chloride, sodium bromide, sodium iodide, potassium chloride, potassium bromide, and potassium iodide.

4. The cathode material according to claim 1, wherein the first active substance accounts for 1%-99% of the mass of the cathode material, and the carrier accounts for 0.1%-95% of the mass of the cathode material.

5. The cathode material according to claim 1, wherein the concentration of the carrier in the mixture is 1-100 mg/g.

6. The cathode material according to claim 1, wherein S2 further comprises slicing the foam.

7. The cathode material according to claim 1, wherein the solution containing the first active substance comprises the first active substance and a solvent; and the solvent is selected from methanol, ethanol, acetone, and dichloromethane.

8. The cathode material according to claim 7, wherein in the solution containing the first active substance, the concentration of the first active substance is 0.01-10 g/mL.

9. The cathode material according to claim 1, wherein the low-dimensional structure comprises a crystalline structure or an amorphous structure.

10. The cathode material according to claim 1, wherein the template and the second active substance have the zero-dimensional structure, the one-dimensional structure, the a two-dimensional structure, or the multi-level structure; and the multi-level structure comprises at least two selected from the zero-dimensional structure, the one-dimensional structure, and the two-dimensional structure.

11. The cathode material according to claim 1, wherein at least a part of the halide or sulfite in the cathode material is in the low-dimensional structure.

12. The cathode material according to claim 1, wherein the second active substance is selected from $LiMn_2O_4$, a ternary material, $Na_nCu_xFe_yMn_zO_2$, $Na_nNi_xFe_yMn_zO_2$, $Na/K_xPR(CN)_6$, in which P and R are independently selected from Fe, Co, Ni or Mn, $K_{0.5}MnO_2$, $LiFePO_4$, $Na_xFe_y(PO_4)_n$, $Na_xFe_y(SO_4)_n$, polypyrrole, and polyaniline.

13. The cathode material according to claim 1, wherein the second active substance comprises nanoparticles and micron spheres comprising nanoparticles.

14. The cathode material according to claim 3, wherein the alkali metal sulfite is selected from at least one of lithium sulfite, sodium sulfite, and potassium sulfite;

the alkaline earth metal halide is selected from at least one of magnesium chloride, magnesium bromide, magnesium iodide, calcium chloride, calcium bromide, and calcium iodide;

the alkaline earth metal sulfite is selected from at least one of magnesium sulfite and calcium sulfite;

the aluminum halide is selected from at least one of aluminum chloride, aluminum bromide, and aluminum iodide;

the zinc halide is selected from at least one of zinc chloride, zinc bromide, and zinc iodide.

15. The cathode material according to claim 1, wherein in the carrier, the mass ratio of the template to the second active substance is (0.1-1):(0-10).

16. The cathode material according to claim 1, wherein the first active substance has the low-dimensional structure or a micro-nano grain structure.

17. The cathode material according to claim 1, wherein in the cathode material, when the first active substance is distributed in the low-dimensional structure, and the first active substance has the low-dimensional structure.

18. The cathode material according to claim 1, wherein when the first active substance is distributed on the carrier, the first active substance forms the micro-nano grain.

19. The cathode material according to claim 18, wherein the particle size of the micro-nano grain is in a range of 0.1-5 μm.

\* \* \* \* \*